United States Patent [19]

Anderson et al.

[11] Patent Number: 4,585,071
[45] Date of Patent: Apr. 29, 1986

[54] METHOD AND APPARATUS GUIDING RETRACTABLE MACHINERY

[75] Inventors: Jack F. Anderson, Marion, N. Dak. 58466; Clayton Melrose, Oakes, N. Dak.

[73] Assignee: Jack F. Anderson, Marion, N. Dak.

[21] Appl. No.: 355,100

[22] Filed: Mar. 3, 1982

Related U.S. Application Data

[63] Continuation-in-part of Ser. No. 240,137, Mar. 2, 1981, Pat. No. 4,491,183.

[51] Int. Cl.⁴ .................... A01B 79/00; A01B 69/06; A01B 65/02
[52] U.S. Cl. .............................. 172/1; 91/32; 91/37; 172/6; 172/38
[58] Field of Search ............ 172/5, 6, 38, 98, 99, 172/111, 117, 233, 234, 235, 1; 56/10.4, 10.7, 11.9, 15.2, 15.5, 15.7; 30/379; 91/32, 35, 37, 459

[56] References Cited

U.S. PATENT DOCUMENTS

| | | | |
|---|---|---|---|
| 1,145,240 | 7/1915 | Gouldh | 172/99 X |
| 2,489,633 | 11/1949 | Fulgham | 172/5 |
| 2,601,366 | 6/1952 | Chapman | 30/379 |
| 2,652,812 | 9/1953 | Fenzl | 91/32 |
| 2,662,561 | 12/1953 | Duncan, Jr. | 30/379 |
| 2,664,802 | 1/1954 | Myer | 172/6 |
| 2,699,635 | 1/1955 | Burton | 56/15.7 |
| 2,718,836 | 9/1955 | Pertics et al. | 172/99 |
| 2,764,077 | 9/1956 | Pertics et al. | 172/99 X |
| 2,791,081 | 5/1957 | Allen et al. | 56/15.7 |
| 2,826,129 | 3/1958 | Olson | 172/38 |
| 2,990,890 | 7/1961 | Butterfield | 172/111 X |
| 2,997,835 | 8/1961 | Stewart | 56/15.7 |
| 3,003,299 | 10/1961 | Smith et al. | 56/15.7 |
| 3,059,704 | 10/1962 | Kasatkin | 172/38 |
| 3,061,996 | 11/1962 | Ripps | 56/10.7 |
| 3,117,632 | 1/1964 | Caggiano, Jr. | 172/5 |
| 3,138,208 | 6/1964 | Simms | 172/38 |
| 3,169,583 | 2/1965 | Thurow | 172/111 |
| 3,190,364 | 6/1965 | Maloney | 172/111 |
| 3,200,890 | 8/1965 | Courtway | 172/111 |
| 3,274,762 | 9/1966 | Jolls | 56/15.2 |
| 3,913,681 | 10/1975 | Lincoln et al. | 172/5 |
| 3,996,838 | 12/1976 | Goff | 91/32 |
| 4,048,789 | 9/1977 | Cartner | 56/11.9 |
| 4,206,580 | 6/1980 | Truax et al. | 56/10.4 |

FOREIGN PATENT DOCUMENTS

| | | | |
|---|---|---|---|
| 55167 | 4/1967 | German Democratic Rep. | 172/5 |
| 178586 | 3/1966 | U.S.S.R. | 172/234 |
| 733528 | 5/1980 | U.S.S.R. | 172/38 |

Primary Examiner—Richard T. Stouffer
Attorney, Agent, or Firm—James R. Young

[57] ABSTRACT

A retractable tool apparatus is adapted to be mounted on a movable vehicle for working the area around and between objects in a row. The tool apparatus includes an extendable and retractable outrigger arm attachable on one of its ends to the vehicle. A work tool is mounted on the other end of the outrigger arm. An electro-hydraulic control system controls the retraction of the outrigger arm. This control system includes sensors in the form of a pair of wands mounted on the outrigger arm to sense objects in proximity to the work tool before the work tool contacts the objects. The first wand activates the control system upon contact with an object to retract the work tool. The second wand holds the control system in its retraction mode upon contact with the object even after the first wand has cleared the object.

19 Claims, 7 Drawing Figures

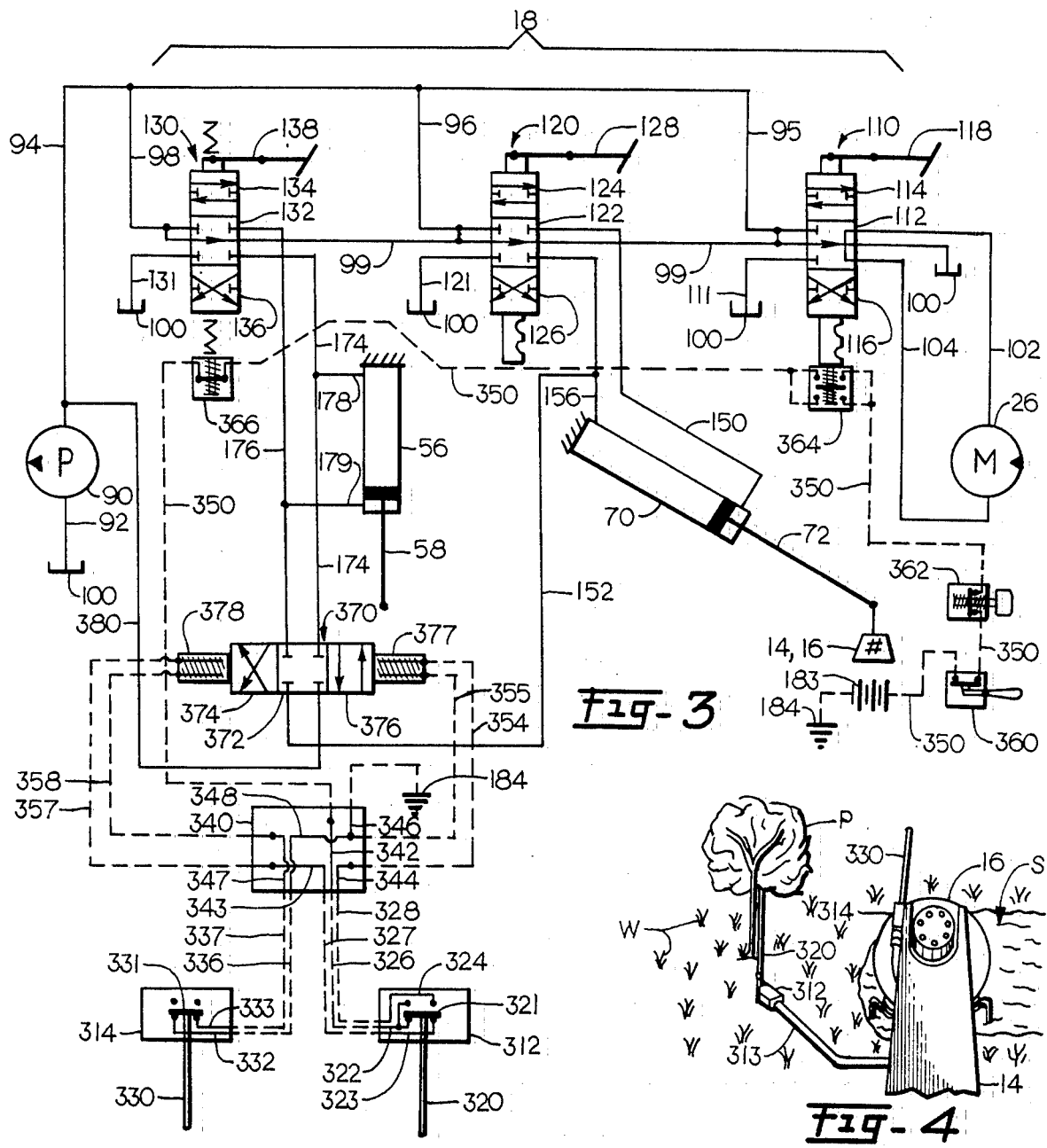
Fig-3
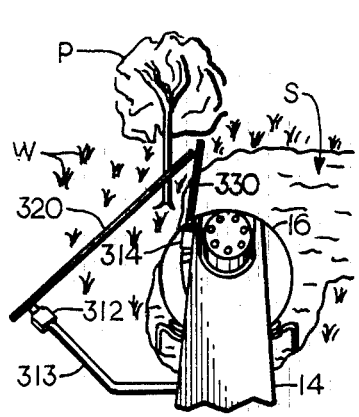
Fig-4
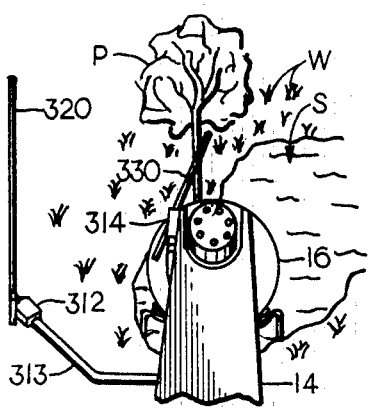
Fig-5
Fig-6
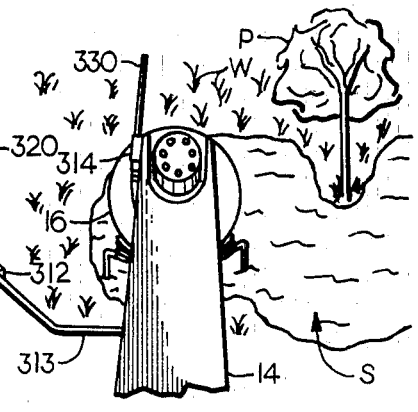
Fig-7

METHOD AND APPARATUS GUIDING RETRACTABLE MACHINERY

This patent application is a continuation-in-part of copending patent application Ser. No. 240,137, entitled "Retractable In-Row Tiller Device," filed Mar. 2, 1981, now U.S. Pat. No. 4,491,183.

The present invention relates generally to tiller apparatus, and more particularly to a novel and improved method and apparatus for guiding automatic retractable rotary tillers adapted for tilling interstitial unplanted soil between plants or objects in a row.

Cultivating or tilling the interstitial unplanted soil between plants in a row to control weed growth, mulch, and aerate the soil is desirable for optimum plant growth and good husbandry. An automatic retractable in-row tiller for mounting on a vehicle and tilling between plants in a row is disclosed in the copending parent application hereto. While that tiller is more versatile, accurate, and responsive than prior art in-row tiller apparatus, some additional improvements in sensitivity and responsiveness, including complete operator control or effective automatic control are still desirable.

SUMMARY OF THE INVENTION

Accordingly, it is an object of the present invention to provide novel, improved, and practical guidance and control apparatus for a retractable tiller adapted for tilling the interstitial unplanted soil around and between objects in a row.

It is also an object of the present invention to provide a novel method for sensing objects and moving a tiller apparatus swifty and accurately around the objects.

A further object of the present invention is to provide retractable in-row tiller apparatus with control including a sensor adapted to accurately sense an object in proximity to the tiller before the tiller contacts the object and to cause the tiller to be automatically retracted from the row to avoid the object as well as to be automatically extended into the row after the tiller has passed the object in a sufficiently responsive and speedy manner to till closely to the plant while allowing acceptable forward speed.

A still further object of the present invention is to provide retractable in-row tiller apparatus wherein the retraction and extension out of and into the row of objects is easily operable with manual controls as well as by automatic sensing controls.

Still another object of the present invention is to provide retractable in-row tiller apparatus having controls wherein an operator can manually override automatic retraction sensing and control features.

The tiller guide and control apparatus of the present invention includes an integrated electro-hydraulic control system for both manually and automatically operating a hydraulic motor for turning the rotary tiller as well as the hydraulic cylinder and ram for raising and lowering the outrigger arm and the rotary tiller out of and into a row of plants. More specifically, the integrated hydraulic control system accommodates manually turning on and off and reversing the rotation of the rotary tiller head, raising and lowering the outrigger arm and tiller head, and retracting and extending the outrigger arm in relation to the vehicle out of and into a row of plants. A pair of sensors spaced apart from each other in a forward/rearward direction are provided to detect the presence of an object or plant in proximity to the rotory tiller and to cause the outrigger arm that supports the rotor to be retracted automatically and then extended automatically back into the row when the plant has been passed by the rotary tiller.

The novel design of the hydraulic control system of the present invention also allows an operator to override manually the automatic retraction and extension feature both to cause retraction and extension in the absence of any objects sensed by the sensor device as well as to prevent retraction in spite of detection of a plant or object in the path of the tiller by the sensor device.

BRIEF DESCRIPTION OF THE DRAWINGS

Other objects, advantages, and capabilities of the present invention will become apparent as the description proceeds taken in conjunction with the accompanying drawings, in which:

FIG. 3 is a schematic diagram of the electro-hydraulic control system for the retractable in-row tiller device of the present invention;

FIG. 4 is a perspective view of the tiller guide apparatus in normal operating mode with tiller extended into a row of plants and with the front wand approaching a plant;

FIG. 5 is a perspective view of the tiller guide apparatus with the front wand in contact with a plant and the tiller retracted out of the row;

FIG. 6 is a perspective view of the tiller guide apparatus with the rear wand in contact with a plant and the tiller remaining retracted out of the row; and FIG. 7 is a perspective view of the tiller guide apparatus not in contact with a plant and the tiller extended back into the row after completion of a retraction/extension cycle.

DETAILED DESCRIPTION OF THE PREFERRED EMBODIMENT

Figure 1:
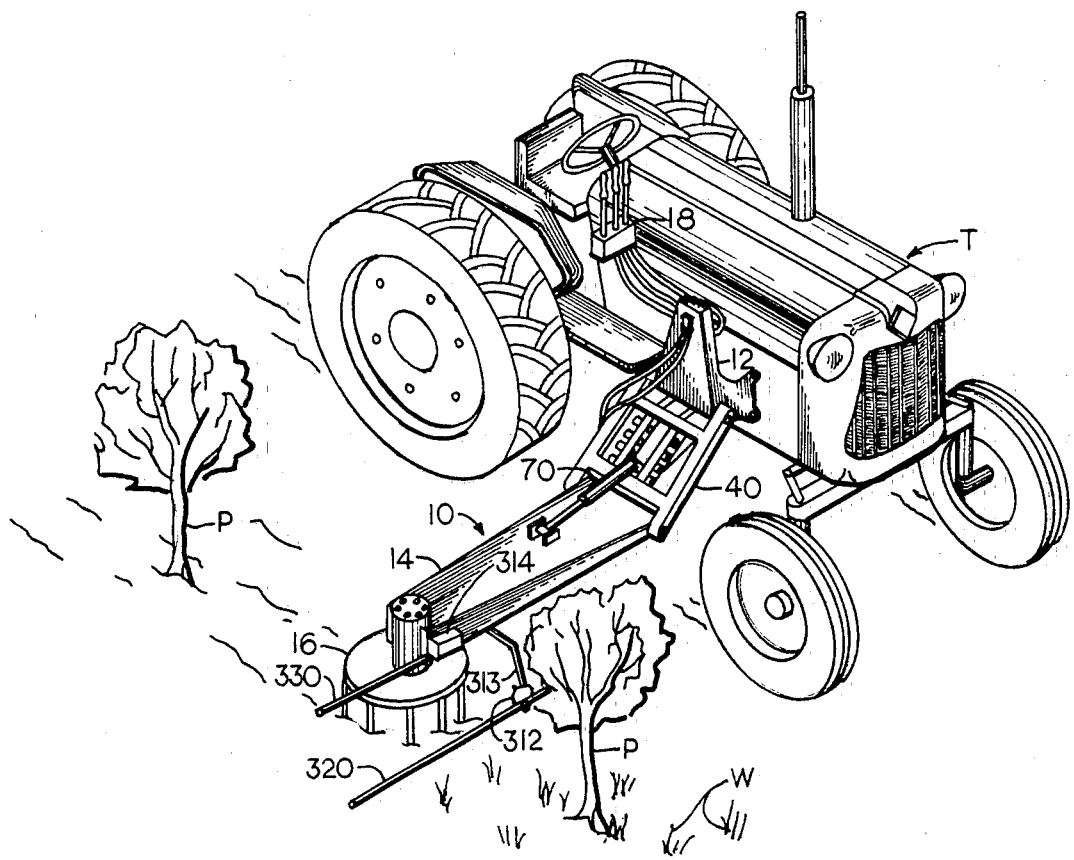
FIG. 1 is a perspective view of the retractable in-row tiller apparatus of the present invention mounted on the side of a tractor and shown tilling the soil between plants in a row.

A retractable tiller device 10 is shown in FIG. 1 mounted on the side of a tractor T. Essentially, the retractable tiller apparatus 10 is comprised of an outrigger arm 14 which extends laterally outward from the side of the tractor T, a rotary tiller head 16 mounted at the distal end of the outrigger arm 14, a mounting frame 12 physically attached to the tractor T, and a trapeze-type extension and retraction assembly 40 pivotally mounted on the mounting frame 12 and pivotally attached to the outrigger arm 14 for retracting the outrigger arm 14 and tiller head 16 toward and away from the tractor T, as will be described more fully below.

As shown in FIG. 1, the outrigger arm 14 extends outwardly from the side of the tractor in a substantially horizontal position above the ground when the tiller head 16 is in position to till the ground. As the tractor T travels substantially parallel to a row of plants P, the rotary tiller head 16 can till the interstitial soil between the plants P. As the tiller head 16 approaches a plant P, the extension and retraction assembly 40 pulls the outrigger arm 14 and tiller head 16 inwardly toward the tractor T a sufficient distance to allow the tiller head 16 to pass around plants P as shown in FIG. 6. When the tiller head 16 has safely passed around a plant P the extension and retraction assembly 40 extends the outrigger arm 14 and tiller head 16 outwardly away from the tractor T and soil between the plants P.

The retractable tiller apparatus 10 of the present invention includes a novel electro-hydraulic control system for controlling the various movements and operations of the tiller apparatus 10. The extension and retraction of the outrigger arm 14 and tiller head 16 can be controlled manually by a valve in valve bank 18, or these functions can be controlled automatically by novel sensor apparatus, including a pair of sensor wands 320, 330, which are adapted to feel the presence of a plant P in proximity to the rotor head 16. Upon detecting the presence of a plant P, the solenoid valve 370 is actuated to cause the outrigger arm 14 and rotary tiller head 16 to be retracted from the row to proceed around the plant P without damaging the plant.

The electro-hydraulic operating system also allows an operator to manually override the automatic retraction feature to prevent the retraction of the rotary tiller 16 from the row if desired. This feature is particularly beneficial where the sensor 76 of the rotary tiller might encounter a large weed or other object that would under normal circumstances cause the tiller head 16 to be retracted out of the row to move around such an object. With the manual override feature provided in this invention, the operator can prevent the retraction of the rotary tiller head 16, thereby causing the tiller to cultivate over the large weed or other object and destroy it. This feature has been found to be quite useful in initial tilling operations wherein large weeds have grown to a size comparable to or larger than the plants in the row being tilled.

The manual controls are conveniently mounted in a valve bank 18 near the operator's seat on the tractor T. All of the automatic and manual operating features mentioned above will be described below in further detail.

The mounting frame 12 is adapted for mounting the tiller device 10 on a desired tractor T or other vehicle. The extension and retraction assembly 40 is comprised of a trapeze carriage frame 42 pivotally mounted on the outer, lower corner of the mounting frame 12 with an upper mounting shaft 52. The trapeze carriage 42 extends generally downwardly from the upper mounting shaft 52, and its lower end is pivotally mounted to the inward end of the outrigger arm 14 with lower mounting shaft 54.

Figure 2:
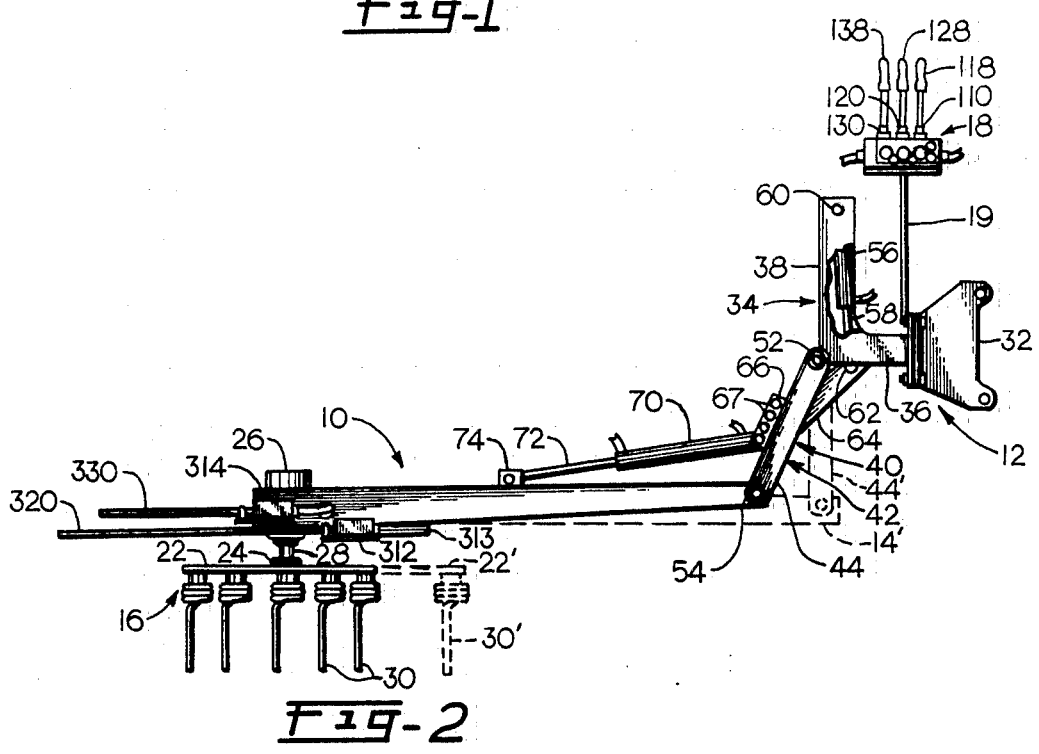
FIG. 2 is a side elevation view of the retractable in-row tiller apparatus of the present invention.

The extension and retraction assembly 40 also includes a channel-shaped lever arm 64 rigidly attached to the trapeze carriage from 42 as best seen in FIG. 2. The lever arm 64 extends inwardly and upwardly from the trapeze carriage frame 42 to a position generally a spaced distance inwardly from upper mounting shaft 52.

The hydraulic cylinder 56 and ram 58 assembly is mounted inside the frame housing 34 for moving and controlling the trapeze carriage frame 42. The upper end of the cylinder 56 is pivotally mounted on a pin 60 attached to the upper end of the frame housing 34, and the lower end of piston rod or ram 58 is pivotally attached to the upper end of lever arm 64 by pin 62. Therefore, downward extension of piston rod or ram 58 causes the lower end of trapeze carriage frame 42 to swing outwardly in relation to the tractor T, and retraction of piston rod or ram 58 into the cylinder 56 causes the lower end of trapeze carriage frame 42 to swing inwardly toward the tractor T. Of course, since the lower end of trapeze carriage frame 42 is attached to the inward end of outrigger arm 14, extension and retraction of the piston rod 58 also causes the outrigger arm 14 and tiller head 16 to be retracted and extended respectively inwardly and outwardly in relation to the tractor T. The retracted position of the trapeze carriage frame, outrigger arm, and tiller head is shown in broken lines in FIG. 2.

As also best seen in FIG. 2, the hydraulic cylinder 70 and ram 72 assembly is mounted between the extension and retraction assembly 40 and the outrigger arm 14 for applying vertical force components on outrigger arm 14 to lift the outrigger arm 14 and to control the soil penetration depth of the tiller head 16. The upper end of cylinder 70 is mounted pivotally to the extension and retraction assembly 40 by pin 71, and the lower end of piston rod or ram 72 is pivotally attached to outrigger arm 14 by pin 73. Therefore, retraction of ram 72 into cylinder 70 causes the outrigger arm 14 and tiller head 16 to be pivoted about lower mounting shaft 54 such that the distal end of outrigger arm 14 and tiller head 16 mounted thereon are lifted away from the ground, and extension of ram 72 outwardly from cylinder 70 causes the distal end of outrigger arm 14 to be lowered toward the ground causing tiller head 16 to penetrate the soil for tilling operations.

It should be noted at this point that while the hydraulic cylinder 70 and ram 72 assembly is operable to lift and lower the tiller head 16 as desired by the operator, the ram 72 must also be able to float inwardly and outwardly of the cylinder 70 as the extension and retraction assembly 40 pivots inwardly and outwardly about upper mounting shaft 52; otherwise, movement of the lower end of trapeze carriage frame 42 outwardly would cause the tiller head 16 to be lifted out of the ground and inward pivotal movement of the lower end of trapeze carriage frame 42 would cause the tiller head 16 to be gouged into the ground. As will be described in more detail below, the hydraulic control system of the present invention not only accommodates these requirements, but also causes the hydraulic cylinder 70 and ram 72 assembly to effectively control the depth penetration of the tiller head 16 in the soil. This automatic control feature of cylinder 70 and ram 72 operates effectively both when the extension and retraction assembly 40 is operated to move the tiller head out of and into a row as well as when the mounting frame 12 moves in conjunction with the tractor T over uneven terrain in relation to the soil in the row to be tilled.

The rotary tiller head 16 is attached to and extends downwardly from the distal end of the outrigger arm 14. A flat circular rotor plate 22 is attached to the motor shaft 28. The hydraulic motor 26 causes the rotor plate 22 to rotate when hydraulic fluid under pressure is supplied to the hydraulic motor 26. A plurality of elongated cultivator teeth 30 are attached to and extend downwardly from the periphery of the rotor plate 22 in spaced-apart relation to each other. The cultivator teeth 30 are adapted to penetrate and till the ground as the tiller head 16 is rotated by hydraulic motor 26.

A valve bank 18 comprised of three valves 110, 120, 130 for manually controlling the functions of the retractable tiller device is mounted on a support 19 above and to the rear of the mounting frame 12 in a position accessible to an operator seated on the tractor T. Manual operating handles 118, 128, 138 are connected respectively to valves 110, 120, 130 for the convenience of the operator. The structure and functions of the motor control valve 110, the lift cylinder control valve 120, and the extension and retraction cylinder control valve 130 will be described in more detail below in conjunction with the description of the electro-hydraulic control system.

The novel plant sensor apparatus of this invention includes two wands 320, 330. The front wand 320 is connected to a front switch 312 mounted ahead of the tiller head 16 on a support arm 313 extending outwardly from outrigger arm 14. The rear wand 330 is connected to a rear switch 314 mounted on the outrigger arm 14 just over the tiller head 16.

As the tiller head 16 is advanced in the row of plants P by the forward motion of the tractor T, the front wand 320 is adapted to contact the plant P just prior to the tiller head 16 reaching the plant P. A small increment of additional forward progress of the tiller apparatus results in the front wand 320 to pivot rearwardly and actuate front switch 312, which causes the extension and retraction assembly 40 to retract the tiller head 16 from the row its allow it to pass around the plant P. As the tiller head 16 continues forwardly, the rear wand 330 also contacts the plant P and pivots rearwardly to actuate rear switch 314. The extension and retraction assembly 40 is held inoperative and cannot act to extend the tiller head 16 back into the row as long as rear switch 314 remains actuated by rear wand 330 being in contact with the plant P, even though the front wand 320 has progressed beyond the plant P and front switch 312 is no longer actuated. Only after the rear wand 330 has also passed beyond the plant P can the extension and retraction assembly 40 operate to extend the tiller head 16 back into the row automatically.

The operator does have the ability to manually override any automatic control function to produce any desired operation or effect. For example, he can push a buttom that causes the tiller head 16 to remain in any position in which it is situated at the time the buttom is pushed. He can also cause the tiller head 16 to be retracted or extended at any time he wishes, regardless of the automatic program functions or positions of the wands 320, 330 or switches 312, 314. For example, if the operator anticipates that the wands 320, 330 encounter a large weed that would normally cause the rotor head 16 to be retracted automatically, the operator can depress pushbutton switch 362 to de-activate the automatic retraction so that the tiller head ly tills out the large weed. If the front wand 320 has already contacted such a large weed and the tiller head is automatically retracted, the operator con manually actuate valve 130 to override the automatic retraction mode and cause the tiller head 16 to be extended back into the large week. On the other hand, if the operator anticipates the rotor 16 will contact a plant that is too small or week to deflect the wands 320, 330, he can manually activate valve 130 to another mode which will cause the tiller to retract to avoid the plant.

The schematic diagram of the electro-hydraulic control system for the retractable in-row tiller device of the present invention is shown in FIG. 3. A pump 90 draws hydraulic fluid from a tank 100 through suction line 92 to provide hydraulic fluid under pressure through the main pressure line 94 to the various components and branch lines of the hydraulic control system. Even though the tank 100 is shown in various locations throughout the schematic diagram in FIG. 3, as is conventional in such diagrams, it is understood to be a common tank or reservoir of hydraulic fluid.

A first branch pressure line 95 connected to main pressure line 94 provides a flow of hydraulic fluid under pressure to drive the hydraulic motor 26 that rotates the tiller head 16. A four-way valve 110, which is a part of the valve bank 18, is positioned in the first branch circuit 95 for manually controlling the flow of hydraulic fluid to the hydraulic motor 26. The valve 110 is comprised essentially of a spool with three control positions 112, 114, 116. The center spool position 112 is a neutral mode in which a hydraulic fluid under pressure in branch line 95 is not allowed to flow to the hydraulic motor 26. Therefore, when the valve 110 is in the neutral mode of spool position 112, the hydraulic motor 26 is not powered.

Spool position 114 is a straight flow through mode, so that when spool position 114 is shifted into alignment with branch pressure line 95 and return line 111, hydraulic fluid under pressure flows from branch pressure line 95 through spool position 114 and line 102 into the hydraulic motor 26 to power the motor in a forward direction. Return hydraulic fluid from the motor 26 flows through line 104 and through spool position 114 into return line 111 and back to tank 100 to complete the hydraulic fluid flow circuit.

Spool position 116 of valve 110 is a cross over mode. Therefore, when spool position 116 is shifted into alignment with branch line 95 and return line 111, hydraulic fluid under pressure flows from pressure line 95 into spool position 116 where it crosses over into line 104 to flow in a reverse direction into hydraulic motor 26 to cause the hydraulic motor 26 to rotate in a reverse direction. In this mode the hydraulic fluid is discharged from the motor 26 through line 102 and into spool position 116 where it is crossed over into the return line 111 to flow back to tank 100.

The valve 110 is provided with a handle 118 for manually shifting the spool to the desired mode for neutral, forward direction, or reverse direction of the hydraulic motor. Detent positions are preferably provided in valve 110 to hold the spool in the desired mode as the tiller apparatus is being operated. It should also be noted that center spool position 112 is preferably provided with a connection between line 102 and 104, as shown in FIG. 3, so that the motor 26 can coast or rotate in float condition when the valve 110 is in neutral position.

A second branch pressure line 96 is provided to direct flow of hydraulic fluid to the lift cylinder 70 and ram 72 assembly. A second four-way valve 120 is positioned in this second branch pressure line 96 and return line 121 to provide manual control of the hydraulic fluid to the lift cylinder 70. Second valve 120 has a spool comprised of three control mode positions 121, 124, and 126. Center spool position 122 is a neutral mode in which flow of hydraulic fluid through pressure branch line 96 and return line 121 is prohibited. When spool position 124 is shifted into alignment with branch pressure line 96 and return line 121, hydraulic fluid under pressure is allowed to flow from branch pressure line 96 straight through spool position 124 and through line 150 into the annular end of lift cylinder 70. Such flow of hydraulic fluid under pressure into the annular end of lift cylinder 70 causes the piston rod or ram 72 to retract into cylinder 70, thereby applying a vertically upward lift force component on outrigger arm 14 to act against the vertically downward force component on outrigger arm 14 resulting from the weight of the outrigger arm 14 and tiller head 16. As the piston rod 72 is retracted into cylinder 70, hydraulic fluid from the blind end of cylinder 70 flows out of the cylinder and through line 156 and spool position 124 into return line 121 to return to tank 100.

Spool position 126 of valve 120 is a cross-over mode. When spool position 126 is shifted into alignment with branch pressure line 96 and return line 121, hydraulic fluid under pressure is allowed to flow from branch pressure line 96 into spool position 126 where it is crossed over to line 156. In this mode, hydraulic fluid under pressure is directed by line 156 into the blind end of lift cylinder 70 causing the piston rod 72 to be extended, thereby applying a vertically downward force component to the outrigger arm 14. As the piston rod 72 is extended outwardly from cylinder 70, hydraulic fluid in the annular end of cylinder 70 is discharged into line 150 and into spool position 126 where it is crossed over into return line 121 to flow back to tank 100. A handle 128 is provided on valve 120 for manual operation thereof, and detent features are also provided to maintain the spool of valve 120 in any of the desired modes provided by positions 122, 124, or 126.

This arrangement for the first and second branch circuits not only provides motor and lift control, as described above, but it also provides a depth control feature for the tiller. When valve 110 in the first branch circuit is in a position to allow flow of hydraulic fluid through motor 26, the pressure in the main pressure line 94 is dropped to a pressure level just necessary to maintain rotation of the hydraulic motor 26, which is determined by the load required to rotate the tiller head 16. As the load required to rotate the tiller head increases, for example, from increased penetration in the ground or from encountering increased resistance to rotation by harder ground or the like, the pressure in main pressure line 94 will be increased correspondingly. Likewise, when the power required to rotate the tiller head 16 is decreased, there will be a corresponding decease in pressure in the main pressure line 94. Under these conditions with the first branch circuit in a mode to power the hydraulic motor 26, when the valve 120 is positioned in a flow through mode, for example, in the straight flow through mode of spool position 124 for forward rotation, the hydraulic pressure in the second branch, i.e., the pressure applied to the lift cylinder 70 and ram 72 assembly, will be approximately equal to the pressure in main pressure line 94 and first branch pressure line 95. This pressure is essentially the pressure required to drive hydraulic motor 26 to rotate tiller head 16. Consequently, if additional pressure is required to rotate tiller head 16, the pressure in main pressure line 14, as well as the pressure to branch pressure line 96 directed into the lift cylinder 70, is correspondingly increased. Likewise, if the power requirements to rotate tiller head 16 is decreased, the pressure in main pressure line 94, as well as in branch pressure line 96 directed to lift cylinder 70, is also decreased. Therefore, when valve 120 is in the straight flow through mode of spool position 124, the vertical force component applied by ram 72 to outrigger arm 14 and tiller head 16 varies in direct proportion to the pressure necessary to rotate the tiller head 16.

The tiller device of the present invention is designed generally such that there is sufficient weight in the combination of the outrigger arm 14 and tiller head 16 to cause the cultivator teeth 30 to penetrate the ground to be tilled. However, control is necessary to insure that the cultivator teeth do not penetrate excessively or gouge into the soil. It is also undesirable to allow the cultivator teeth to be lifted out of the soil due to the tractor moving over uneven terrain or due to the pivotal movement of the extension and retraction assembly 40 in the geometry of its connection to outrigger arm 14 as described above. Therefore, the size of the hydraulic motor 26 and the size and position of the lift cylinder 70 are preferably arranged such that an optimum balance is reached wherein the hydraulic pressure required to rotate tiller head 16 with the cultivator teeth 30 at a desired depth is approximately equal to the hydraulic pressure required to be applied to the piston in lift cylinder 70 to result in a sufficient vertically upward force component by ram 72 on outrigger arm 14 to maintain the cultivator teeth 30 on the tiller head 16 at that desired depth.

For example, if the tractor tilts in a direction that would tend to gouge the cultivator teeth deeper into the ground, the pressure required to continue rotating the tiller head 16 would increase almost instantaneously. With valve 120 in the straight flow through mode of spool position 124, the pressure applied through line 150 into the annular end of lift cylinder 70 would likewise be increased simultaneously to provide an increased lifting force vector on outrigger arm 14. This increased lifting force vector pulls the tiller head and cultivator teeth 30 upwardly to a more shallow depth where the optimum pressure balance required by motor 26 to rotate the tiller head 16 as well as by lift cylinder 70 to maintain the optimum depth is again reached.

Similarly, if the tractor T tips the opposite direction, which would tend to lift the tiller head 16 and cultivator teeth 30 out of the ground, the pressure required to power hydraulic motor 26 to rotate the tiller head 16 would be decreased, thereby causing a simultaneous corresponding decrease in hydraulic pressure in main pressure line 94 and a corresponding decrease in hydraulic pressure applied to the annular end of lift cylinder 70 to result in a decrease in the vertical lift force component applied by ram 72 on outrigger arm 14. Therefore, the weight of the outrigger arm 14 and tiller head 16 would be allowed to pull the tiller head 16 downwardly to cause the cultivator teeth 30 to penetrate deeper into the ground to the desired optimum depth where a balance in hydraulic pressure required to drive hydraulic motor 26 and to maintain the desired vertical force component on outrigger arm 14 by ram 72 is reached.

In a like manner, the same pressure balancing and operational functions of the integrated hydraulic motor circuit and lift cylinder circuit accommodate angle changes between the trapeze carriage frame 42 and outrigger arm 14 during extension and retraction of the outrigger arm 14 and tiller head 16 into and out of a row by the extension and retraction assembly 40, as required by the geometry of the apparatus described above. This accommodation of angle changes during retraction and extension motion is accomplished while still maintaining the desired penetration depth of the cultivator teeth 30 through out such retraction and extension operations.

A third branch pressure line 98 is provided off main pressure line 94 for a primary supply of hydraulic fluid under pressure to the extension and retraction cylinder 56 and rod 58 assembly. This third branch pressure line 98 and return line 131 provides a source of hydraulic fluid under pressure for the manual operation of the extension and retraction cylinder 56 and rod 58.

A fourth branch pressure line 380 is provided off main pressure line 94 for a secondary supply of hydraulic fluid under pressure to the extension and retraction cylinder 56 and rod 58 assembly. This fourth branch pressure line 380 and return line 152 provide a source of hydraulic fluid under pressure for the automatic operation of the extension and retraction cylinder 56 and rod 58.

For clarity, the automatic control of the extension and retraction cylinder 56 and rod 58 assembly will be described first. This description will be followed by a description of the manual control for the extension and retraction assembly by use of valve 130. A three position four-way solenoid valve 370 positioned in the fourth branch pressure line 380 and in return line 152 provides the automatic hydraulic fluid control modes for the automatic extension and retraction of the outrigger arm 14 and tiller head 16 by action of the cylinder 56 and rod 58. The solenoid valve 370 has three control mode positions, a neutral position 372 in the center, a straight flow through positions 376 to one side, and a cross over position 374 on the opposite side.

In the neutral mode 372, all flow of hydraulic fluid through the solenoid valve 370 is blocked. Therefore, when the solenoid valve 370 is in neutral position 372, and manual valve 130 is in neutral position 132, rod 58 of cylinder 56 cannot be moved and the tiller head 16 cannot be retracted or extended.

When coil 378 of solenoid valve 370 is energized, it pulls the valve spool into the straight flow through position 376. In that position, a flow of hydraulic fluid under pressure from branch pressure line 380 is directed into line 174 and through line 178 into the blind end of cylinder 56. Fluid from the rod and of cylinder 56 is returned through line 179, 176, 152, 156 and 121 to tank. Therefore, when the solenoid valve 370 is in the straight flow through position 376, hydraulic fluid under pressure is directed into the blind end of cylinder 56, which extends tiller head 16 away from the tractor T and into the row of plants P.

When coil 377 of solenoid valve 370 is energized, the valve spool is positioned in the cross over mode of position 374. In this cross over mode 374, hydraulic fluid under pressure from pressure line 380 is directed into line 176 and through line 179 into the piston end of cylinder 56 to cause the tiller head 16 to be retracted toward the tractor T and out of the row of plants P. Therefore, it can be appreciated that shifting the spool of solenoid valve 370 back and forth between position 376 and the cross over position 374 results in corresponding extension and retraction of rod 58 in cylinder 56. When the solenoid valve 370 is in the neutral position 372, it functions as a lock valve and blocks all flow of hydraulic fluid therethrough.

An electric power source 183 provides electric power to the coils 377, 378 of the solenoid valve 370. A number of switches in the electric circuit, in combination with the hydraulic valves 110, 130 provide manual and automatic control of the extension and retraction of the tiller.

The first switch in the power line 350 of the electric circuit is a toggle switch 360 that can open or close the circuit. The next switch in the power line 350 is a normally closed pushbutton switch 362. The third switch 364 is connected to the actuator of valve 110 it opens when valve 110 is in the neutral position 112 and closes when valve 110 is in either the straight flow through position 114 or the cross over position 116. A fourth switch 366 is connected to the actuator of valve 130 in such a manner that it is normally closed when valve 130 is in the neutral position 132, and it is open when valve 130 is in either the straight flow through position 134 or the cross over position 136. The toggle switch 360 and push-button switch 362 provide certain manual controls that will be described below. Switches 364, 366 are provided to interface the electric circuit control of solenoid valve 370 in an appropriate manner with the manual control of valves 110, 130.

The automatic retraction and extension control of the tiller is based primarily on sensing the proximity of plants P to the tiller head 16. Two switches 312, 314 provide the principal input signals to the automatic control. Each of these switches 312, 314 has an elongated wand 320, 330, respectively, attached thereto and extending outwardly therefrom. As mentioned above, the front switch 312 is mounted on a support arm 313 a spaced distance ahead of the tiller head 16. The rear switch 314 is positioned on the outrigger arm 14 over the tiller head 16.

The front switch 312 directs electric power alternatively to coil 377 or to coil 378, and the rear switch 314 can connect or break the ground from coil 378. Front switch 312 has three buses 322, 323, 324 therein. In the normal position, switch 312 connects bus 322 with bus 323. In the alternate position, switch 312 connects bus 322 to bus 324.

The rear switch 314 has only two active buses 332, 333 therein. Rear switch 314 is normally closed to connect buses 332, 333 together. In the alternate position, switch 314 is open so that there is no connection therein.

Therefore, when wand 320 of front switch 312 contacts a plant P, switch 312 is shifted to the alternate position so that the circuit between buses 322, 323 is broken and contact is made between buses 322, 324. When wand 330 of rear switch 314 contacts a plant P, the connection between buses 332, 333 is broken so that no current can blow therethrough.

The main power line 350 is connected to bus 342. Wire 326 connects power bus 342 in circuit box 340 to bus 322 in front switch 312. Wire 327 connects power bus 323 in front switch 312 to power bus 343 in circuit box 340, and wire 357 connects power bus 343 to coil 378. Wire 328 connects power bus 324 in front switch 312 to power bus 344 in circuit box 340, and wire 354 connects power bus 344 to coil 377.

Ground bus 346 in circuit box 340 is connected to ground 184 and to ground bus 348. Wire 336 connects ground bus 348 in circuit box 340 to ground bus 332 in rear switch 314. Wire 337 connects ground bus 333 in rear switch 314 to ground bus 347 in circuit box 340. Wire 358 connects coil 378 to ground bus 347, and wire 355 connects coil 377 to ground bus 346.

A description of the electro-hydraulic circuit of this invention as shown in FIG. 3 is best made in combination with reference to FIGS. 4 through 7. In the normal operating mode, pump 90 supplies a flow of hydraulic fluid under pressure to the four branch pressure lines described above, and battery 183 provides a source of electric power to the electrical components of the circuit. Toggle switch 360 and pushbutton switch 362 are normally closed so that electric power can flow therethrough in power line 350.

Lever 118 of valve 110 is pulled back to position valve 110 in the straight flow through mode of position 114 in order to start the hydraulic motor 26 turning. Simultaneously, switch 364 connected to the actuator of valve 110 is closed to actuate the automatic electric feeler guide system 310. It should be noted here that when valve 110 is in the neutral position 112 so that hydraulic motor 26 is not powered, swithc 364 is open. Therefore, the automatic retraction and extension controls 310 are not energized unless the motor 26 is turning.

However, when switches 364, 366 are closed, bus 322 in front switch 312 is energized. In the normal position of switch 312, therfore, buses 322, 323 are placed in contact with each other, which directs electric power through wires 327, 357 to coil 378. With rear switch 314 in normal position, coil 378 is also grounded so that coil 378 is energized. Consequently, upon starting the hydraulic motor 26 with valve 110, switch 364 is closed to energize coil 378. Energized coil 378 positions solenoid valve 370 in the straight flow through mode of position 376 to immediately extend cylinder 56 and tiller head 16 outwardly away from the tractor T and into the row of plants P.

With the hydraulic motor 26 running and the automatic extension and retraction controls 310 energized, the operator can pull back on lever 128 of valve 120 to position valve 120 in the straight flow through mode of position 124. This position 124 allows the weight of the outrigger arm 14 and tiller head 16 to slowly extend rod 72 in cylinder 70 against the system pressure required to turn motor 26 so that the tiller head 16 is lowered slowing into the ground. This normal condition is generally illustrated in FIG. 4 wherein the tiller head 16 is moving toward a plant P.

As the tiller moves forward, front wand 320 contacts the plant P and is deflected rearwardly as shown in FIG. 5. This rearward deflection of wand 320 actuates front switch 312 to the alternate position so that bus 323 is deenergized and bus 324 is connected to power. This alternate position of front switch 312 deenergizes coil 378 and energizes coil 377. The energized coil 377 shifts solenoid valve 370 to the cross over mode of position 374, which directs pressurized hydraulic fluid to the rod end of cylinder 56. Of course, pressure on the rod end of cylinder 56 causes the tiller head 16 to be retracted as shown in FIG. 5.

With the tiller head 16 retracted, forward motion of the tractor T and tiller continues as shown in FIG. 6 to a position where the rear wand 330 is deflected by the plant P and the front wand 320 clears the plant P and returns to its normal position. When the wand 320 returns to its normal position, front switch 312 again directs the electric power away from coil 377 and back to coil 378. However, with wand 330 still deflected rearwardly, rear switch 314 breaks the ground so that neither coil 377, 378 is energized. With neither coil energized, solenoid valve 370 returns to the neutral position 372 which holds cylinder 56 and tiller head 16 in the retracted position as shown in FIG. 6 until tiller head 16 passes plant P.

Finally, when the tiller is past plant P, as shown in FIG. 8, wand 330 also clears the plant P and returns rear switch 314 to the normal position where the ground leads are again connected. Therefore, with front switch 312 again directing electric power to solenoid 378 and with rear switch 314 again connecting ground, coil 378 is energized to poistion solenoid valve 370 into the straight flow through mode of position 376. This condition again causes cylinder 56 to extend tiller head 16 back into the row.

Anytime the operator desires to hold the tiller head 16 in any particular position, all he has to do is depress pushbutton switch 362, which deenergizes the automatic control circuit 310. Deenergizing the circuit causes the solenoid valve 370 to shift to the neutral position 372. Of course, in the neutral position 372, cylinder 56 is locked in place and cannot extend or retract.

If the operator desires to override the automatic controls 310, he can do so be actuating valve 130. For example, if the operator desires to manually retract the tiller head 16 from the row, he can pull back on lever 138 to shift valve 130 to the straight flow through mode of position 134. In this straight flow through position 134, hydraulic fluid under pressure is supplied from branch circuit 98 through line 176 and line 179 into the rod end of cylinder 56 to cause retraction. It should be noted that as valve 130 is shifted into position 134, switch 366 is simultaneously opened so that the automatic control circuit 310 is deenergized and solenoid valve 370 is shifted to the neutral position 372. When solenoid valve 370 is in neutral position 372, hydraulic flow through solenoid valve 370 is blocked so that fluid under pressure in line 176 or line 174 can operate cylinder 56. Also, with flow through the solenoid valve 370 blocked, retraction and extension of cylinder 56 is completely within the control of manual valve 130.

Likewise, if the automatic control 310 has caused the cylinder 56 to retract, such as by front wand 320 contacting a large weed, the operator can extend cylinder 56 manually by pushing forward on lever 138 to shift valve 130 to the cross over mode of position 136. As he does so, switch 366 again is opened to deenergize the automatic controls 310 and solenoid valve 370 shifts immediately to the neutral position 372. Therefore, hydraulic fluid under pressure flows from branch line 98 through the cross over position 136 in valve 130 and through lines 174, 178 into the blind end of cylinder 56. This condition causes extension of the tiller head 16 back into the row to destroy the weed that initially caused the retraction.

The toggle switch 360 is not particularly necessary in the circuit, but it is convenient for deenergizing the automatic control circuit if the operator so desires. For example, if an orchard has become overgrown with large weeds that would deflect the wands, the operator might desire to operate the system manually on the first time through with the tiller. Opening toggle switch 360 deenergizes the electric guide system 310, so the retraction and extension of the tiller can be controlled manually on an extended basis. Also, it is sometimes desirable to rotate the tiller head 16 in a raised position, such as to clear it of weeds. When an operator desires to perform this function, it is usually not desirable to have the automatic extension and retraction control energized. An open toggle switch 360 can allow running the hydraulic motor 26 in the raised position without the automatic controls 310 being energized.

While the present invention has been described with some degree of particularity, it should be appreciated that the present invention is defined by the following claim construed in light of the prior art so that modification or changes may be made to embodiments of the present invention without departing from the inventive concepts comprised herein.

What is claimed is:

1. In tool apparatus having reversible hydraulic powered motion producing means for moving a tool automatically in one direction and in the opposite direction, said motion producing means having a first hydraulic fluid flow port and a second hydraulic fluid flow port and being adapted to produce motion in a first direction in response to pressurized fluid flow into the first port and to produce motion in a second direction in response to pressurized fluid flow into the second port, and a control system for actuating the motion producing means in response to a predetermined condition, the improvement comprising:

a main pressurized hydraulic fluid circuit having a main pressure flow line carrying hydraulic fluid under pressure from a pressurizing source and a main return line for carrying hydraulic fluid to tank, said main pressure flow line being connected in fluid flow relation to said first port of said motion producing means and said main return line being connected in fluid flow relation to said second port of said motion producing means;

an alternate branch hydraulic fluid circuit having a branch pressure flow line connected in parallel to said main pressure flow line and a branch return line for carrying hydraulic fluid to tank, said branch pressure flow line also being connected to said first port and said branch return line also being connect to said second port such that said motion producing means can be operated by pressurized hydraulic fluid flow from both said main hydraulic circuit and from said branch hydraulic circuit;

automatic valve means positioned in said main hydraulic circuit, said automatic valve means having a normal position adapted to block flow of hydraulic fluid therethrough to said motion producing means, an alternate straight flow through position allow flow of hydraulic fluid therethrough such that hydraulic fluid can flow from the pressurizing source through said main pressure flow line and through said valve means and continue through the remainder of said main pressure flow line into said first port of said motion producing means and return fluid can flow from said motion producing means out said second port thereof and through said main return line to tank, thereby causing said motion producing means to produce motion in said first direction, and said automatic valve means also having an alternate cross over position adapted to receive pressurized fluid flow from said pressurizing source through said main pressure flow line and into said automatic valve means and therein to direct said pressurized fluid flow to cross over into said main return line to direct pressurized fluid flow into said second port of said motion producing means while allowing return fluid flow out of said first port to tank, thereby causing said motion producing means to produce motion in said second direction;

sensing means for sensing occurrence of said predetermined condition and for causing said automatic valve means to change from said normal position to said alternate position in response to occurrence of said predetermined condition;

manual valve means positioned in said branch circuit between the connection of said branch circuit to said main circuit and said motion producing means, said manual valve means having a normal position adapted to block flow of hydraulic fluid in said branch circuit to said motion producing means, and said valve means having an alternate straight flow through position adapted to allow normal flow of hydraulic fluid therethrough such that hydraulic fluid can flow from the pressurizing source through said branch pressure flow line and through said valve means and continue through the remainder of said branch pressure flow line into said first port of said motion producing means and return fluid can flow from said motion producing means out said second port thereof and through said branch return line to tank, thereby causing said motion producing means to produce motion in said first direction; and circuit lock means connected to said manual valve means for automatically moving said automatic valve means to said normal position simultaneous with moving said manual valve means to a position other than said normal position for prohibiting flow of pressurized hydraulic fluid in said branch circuit from bypassing said motion producing means and flowing to tank through said automatic valve means.

2. The improvement of claim 1, wherein said automatic valve means includes a three position four-way solenoid valve, and said circuit lock means includes bias means in said solenoid valve for biasing said solenoid valve to said normal position when said solenoid valve is deenergized, and switch means connected to said manual valve means for deenergizing said solenoid valve when said manual valve is moved to one of said alternate positions.

3. In a retractable tiller apparatus having a rotary tiller mounted on a vehicle and reversible hydraulic powered motion producing means for moving the tiller automatically in one direction and in the opposite direction, said motion producing means having a first hydraulic fluid flow port and a second hydraulic fluid flow port and being adapted to produce motion in a first direction in response to pressurized fluid flow into the first port and to produce motion in a second direction in response to pressurized fluid flow into the second port, and a control system for actuating the motion producing means in response to a predetermined condition, the improvement comprising:

a main pressurized hydraulic fluid circuit having a main pressure flow line carrying hydraulic fluid under pressure from a pressurizing source and a main return line for carrying hydraulic fluid to tank, said main pressure flow line being connected in fluid flow relation to said first port of said motion producing means and said main return line being connected in fluid flow relation to said second port of said motion producing means;

an alternate branch hydraulic fluid circuit having a branch pressure flow line connected in parallel to said main pressure flow line and a branch return line for carrying hydraulic fluid to tank, said branch pressure flow line also being connected to said first port and said branch return line also being connected to said second port such that said motion producing means can be operated by pressurized hydraulic fluid flow from both said main hydraulic circuit and from said branch hydraulic circuit;

automatic valve means positioned in said main hydraulic circuit, said automatic valve means having a normal position adapted to block flow of hydraulic fluid therethrough to said motion producing means, an alternate straight flow through position to allow flow of hydraulic fluid therethrough such that hydraulic fluid can flow from the pressurizing source through said main pressure flow line and through said valve means and continue through the remainder of said main pressure flow line into said first port of said motion producing means and return fluid can flow from said motion producing means out said second port thereof and through said main return line to tank, thereby causing said motion producing means to produce motion in said first direction, and said automatic valve means also having an alternate cross-over position adapted to receive pressurized fluid flow from said pressurizing source through said main pressure flow line and into said automatic valve means and therein to direct said pressurized fluid flow to cross over into said main return line to direct pressurized fluid flow into said second port of said motion producing means while allowing return fluid flow out of said first port to tank, thereby causing said motion producing means to produce motion in said second direction;

sensing means for sensing occurrence of said predetermined condition and for causing said automatic valve means to change from said normal position to said alternate position in response to occurrence of said predetermined condition;

manual valve means positioned in said branch circuit between the connection of said branch circuit to said main circuit and said motion producing means, said manual valve means having a normal position adapted to block flow of hydraulic fluid in said branch circuit to said motion producing means, and said valve means having an alternate straight flow through position adapted to allow normal flow of hydraulic fluid therethrough such that hydraulic fluid can flow from the pressurizing source through said branch pressure flow line and through said valve means and continue through the remainder of said branch pressure flow line into said first port of said motion producing means and return fluid can flow from said motion producing means out and second port thereof and through said branch return line to tank, thereby causing said motion producing means to produce motion in said first direction; and circuit lock means connected to said manual valve means for automatically moving said automatic valve means to said normal position simultaneous with moving said manual valve means to a position other than said normal position for prohibiting flow of pressurized hydraulic fluid in said branch circuit from bypassing said motion producing means and flowing to tank through said automatic valve means.

4. The improvement of claim 3, wherein said automatic valve means includes a three position four way solenoid valve, and said circuit lock means includes bias means in said solenoid valve for biasing said solenoid valve to said normal position when said solenoid valve is deenergized, and switch means connected to said manual valve means for deenergizing said solenoid valve when said manual valve is moved to one of said alternate positions.

5. In retractable tool apparatus adapted for mounting on a moveable vehicle and for working the area around and between objects in a row as the vehicle moves substantially parallel to the row, wherein the tool apparatus has an extendable and retractable outrigger arm attachable at its proximal end to said vehicle, a work tool mounted on its distal end, and reversible hydraulic motion producing means connected to said outrigger arm for retracting and extending said outrigger arm in relation to said vehicle, the improvement comprising:

retraction control means associated with said outrigger arm and with said drive means for activating said drive means when said work tool approaches an object which is adapted to cause retraction of said outrigger arm in relation to said vehicle a sufficient distance for said work tool to clear said object, said retraction control means including a three position four-way valve, one position of which is adapted to direct flow of hydraulic fluid to drive said hydraulic motion producing means in one direction, a second position of which is adapted to direct flow of hydraulic fluid to drive said hydraulic motion producing means in the opposite direction, and a third position of which is adapted to block flow of hydraulic fluid in either direction, and sensor means mounted on said outrigger arm for sensing an object in proximity to said work tool before said work tool contacts said object for activating said retraction control means, said sensor means including a first wand for activating said retraction control means upon contact with said object to cause said hydraulic motion producing means to retract said work tool, and a second wand for holding said retraction control means in retraction mode upon contact with said object even after said first wand has cleared said object.

6. The retractable tool apparatus of claim 5, wherein said three position four way valve is solenoid actuated and said retraction control means includes first switch means for directing electric power to said solenoid valve in a first mode to actuate said solenoid valve to said one position and alternately for directing electric power to said solenoid valve in a second mode to actuate said solenoid valve to said second position, and second switch means for breaking the circuit directing electric power to said solenoid valve in said first mode to cause it to move to said third mode, said first wand being connected to actuate said first switch means, and said second wand being connected to actuate said second switch means.

7. The retractable tiller apparatus of claim 6, including remote manual control means for activating said drive means in response to manual input by an operator.

8. The retractable tiller apparatus of claim 7, wherein said remote manual control means includes switch means for deenergizing said automatic control means to move said solenoid valve to said third position, and manual valve means having a first position for directing a flow of hydraulic fluid through an alternate route to said hydraulic motion producing means in such a manner to drive said hydraulic motion producing means in said one direction.

9. The retractable tiller apparatus of claim 8, wherein said manual valve means also includes a second position for directing a flow of hydraulic fluid through an alternate route to said hydraulic motion producing means in such a manner to drive said hydraulic motion producing means in said opposite direction.

10. The retractable tiller apparatus of claim 6, including remote manual override means for blocking said drive means from being activated by said automatic control means even when an object is proximity to said tiller means is sensed by said automatic control means.

11. The retractable tiller apparatus of claim 10, wherein said manual override means includes a normally closed switch adapted to break the electric circuit and deenergize said automatic control means.

12. Guidance apparatus for machinery comprising:
reversible hydraulic motion producing means responsive to flow of hydraulic fluid therein in one direction to produce motion in said one direction when the machinery is approaching an object and responsive to flow of hydraulic fluid therein in the opposite direction to produce motion in said opposite direction when the machinery is proceeding away from the object;
automatic control means for activating said reversible hydraulic motion producing means in the appropriate direction, said automatic control means including a three position four-way solenoid valve in the hydraulic circuit for said reversible hydraulic motion producing means, said solenoid valve having a first position that blocks flow of hydraulic fluid therethrough, a second position that directs flow of hydraulic fluid to said motion producing means in said one direction, and a third position that directs flow of hydraulic fluid to said motion producing means in said opposite direction; and
object sensing means associated with said automatic control means for sensing the proximity of said object to said machinery, said object sensing means including first contact means and second contact means in spaced apart relation to each other, said first contact means being adapted to activate said motion producing means in one direction upon contact with said object, and said second contact means being adapted to prohibit activation of said motion producing means in said opposite direction as long as said second contact means maintains contact with said object.

13. The guidance apparatus of claim 12, wherein said first contact means includes a switch adapted for directing electric power to said solenoid valve selectively to actuate said solenoid valve to said second position when said first contact means is not in contact with said object, and alternately to actuate said solenoid valve to said third position when said first contact means is in contact with said object, said second contact means includes a switch adapted to break the electric circuit that actuates said solenoid valve to said second position when said second contact means is in contact with said object and said solenoid valve is biased to said first position when not energized.

14. The method of guiding machinery in relation to an immoveable object, comprising the steps of:
connecting reversible hydraulic motion producing means to said machinery in such a manner that said reversible motion producing means is capable of selectively moving said machinery toward and away from said object;
mounting first object sensing means and second object sensing means on said machinery in spaced apart relation to each other for sensing an object in proximity to said machinery;
connecting said first and second object sensing means to said reversible hydraulic motion producing means in such a manner that said first object sensing means causes said reversible hydraulic motion producing means to move said machinery away from said object when it senses the presence of an object in proximity to said machinery and said second object sensing means prohibits said reversible hydraulic motion producing means from moving said machinery closer to said object when it senses the presence of the object in proximity to the machinery;
using electric solenoid valve means for directing hydraulic fluid to said motion producing means in selective forward and reverse directions and for stopping flow of hydraulic fluid to said motion producing means;
directing electric power to actuate said solenoid valve means to move said motion producing means in one direction when neither said first object sensing means nor said second object sensing means senses an object in proximity to said machinery;
directing electric power to actuate said solenoid valve means to move said motion producing means in the opposite direction when said first object sensing means senses an object in proximity to said machinery; and
prohibiting electric power to said solenoid valve means to move said motion producing means in said one direction when said second object sensing means senses an object in the proximity of said machinery.

15. Guidance apparatus for a retractable tiller mounted on a vehicle for guiding the tiller around objects in the path of the tiller, comprising:
reversible motion producing means for said moving tiller in one direction when approaching an object and for moving said tiller in the opposite direction when proceeding away from said object, wherein said reversible motion producing means includes reversible hydraulic motion producing means responsive to flow of hydraulic fluid therein in one direction to produce motion in said one direction and responsive to flow of hydraulic fluid therein in the opposite direction to produce motion in said opposite direction;
automatic control means for activating said reversible motion producing means in the appropriate direction, including a three position four-way solenoid valve in the hydraulic circuit for said motion producing means, said solenoid valve having a first position that blocks flow of hydraulic fluid therethrough, a second position that directs flow of hydraulic fluid to said motion producing means in said one direction, and a third position that directs flow of hydraulic fluid to said motion producing means in said opposite direction; and
object sensing means associated with said automatic control means for sensing the proximity of said object to the tiller, said object sensing means including first contact means and second contact means in spaced apart relation to each other, said first contact means being adapted to activate said motion producing means in one direction upon contact with said object, and said second contact means being adapted to prohibit activation of said motion producing means in said opposite direction as long as said second contact means maintains contact with said object.

16. The guidance apparatus of claim 15, wherein said first contact means includes a switch adapted for directing electric power to said solenoid valve selectively to actuate said solenoid valve to said second position when said first contact means is not in contact with said object, and alternately to actuate said solenoid valve to said third position when said first contact means is in contact with said object, said second contact means includes a switch adapted to break the electric circuit that actuates said solenoid valve to said second position when said second contact means is in contact with said object and said solenoid valve is biased to said first position when not energized.

17. Guidance apparatus for machinery, comprising:
reversible motion producing means for moving the machinery in one direction and in the opposite direction;
control means for activating said reversible motion producing means, said control means being adapted to activate said motion producing means to move the machinery in said one direction upon input of said first signal and to actuate said motion producing means to move the machinery in the opposite direction upon input of a second signal; and
first sensor means for sensing objects in a first predetermined proximity to the machinery and producing signals to said control means, said first sensor means being adapted to produce said first signal when there is no object within said first predetermined proximity and to produce said second signal when there is an object within said first predetermined proximity; and
second sensor means positioned a distance spaced apart from said first sensor means for sensing objects in a second predetermined proximity to the machinery and for preventing movement of said machinery in said opposite direction when the object is in said second predetermined proximity, said second sensor means being adapted to break and prevent said second signal from being received by said control means.

18. The guidance apparatus of claim 17, wherein said first sensor means produces an on state first signal and an off state second signal when there is no object in said first predetermined poximity and it produces an off state first signal and an on state second signal when there is an object in said first predetermined proximity, and said second sensor means converts any on state first signal produced by said first sensor means to an off state first signal when there is an object in said second predetermined proximity.

19. The guidance apparatus of claim 18, wherein said reversible motion producing means is a reversible hydraulic motion producing means, said control means includes solenoid valve means for directing hydraulic fluid to said reversible hydraulic motion producing means in selected directions for motion in one direction or the opposite direction in response to said first and second electrical signals, respectively, and wherein said first sensor means includes first switch means for producing on and off state first signals and on and off state second signals and said second sensor means includes second switch means for interrupting and preventing on state first signals from reaching said solenoid valve.

* * * * *